(12) United States Patent
Matsuoka et al.

(10) Patent No.: US 7,942,996 B2
(45) Date of Patent: May 17, 2011

(54) METHOD OF CUTTING MULTILAYER BODY, METHOD OF FORMING MULTILAYER CONTAINER, AND MULTILAYER FORMED PRODUCT

(75) Inventors: Kikuo Matsuoka, Yokohama (JP); Shinji Tanaka, Yokohama (JP); Yasuyo Sano, Boston, MA (US); Toshihiro Takai, Aichi-Gun (JP); Kenichi Mizoguchi, Aichi-Gun (JP); Hideki Usami, Aichi-Gun (JP); Tomoaki Haruta, Chuo-Ku (JP)

(73) Assignees: Toyo Seikan Kaisha, Ltd., Chiyoda-Ku (JP); Asano Laboratories Co., Ltd., Aichi-Gun (JP)

( * ) Notice: Subject to any disclaimer, the term of this patent is extended or adjusted under 35 U.S.C. 154(b) by 84 days.

(21) Appl. No.: 12/541,294

(22) Filed: Aug. 14, 2009

(65) Prior Publication Data

US 2009/0304960 A1 Dec. 10, 2009

Related U.S. Application Data

(62) Division of application No. 10/522,392, filed as application No. PCT/JP2003/009487 on Jul. 25, 2003, now Pat. No. 7,833,379.

(30) Foreign Application Priority Data

Jul. 25, 2002 (JP) ................................. 2002-217342

(51) Int. Cl.
*B32B 38/04* (2006.01)
*B26D 7/10* (2006.01)

(52) U.S. Cl. ................ 156/251; 156/515; 83/16; 83/19; 83/170; 83/15; 428/35.7

(58) Field of Classification Search .................. 156/250, 156/251; 83/15, 16, 19, 170, 861, 869, 49, 83/55; 428/35.7; 100/94, 39, 98
See application file for complete search history.

(56) References Cited

U.S. PATENT DOCUMENTS

| 2,635,672 A | 4/1953 | Rumsey, Jr. |
| 2,735,797 A | 2/1956 | Schjeldahl |
| 3,257,256 A | 6/1966 | Lehmacher et al. |
| 3,513,052 A | 5/1970 | Ariyasu et al. |
| 3,522,135 A | 7/1970 | Page |
| 3,574,039 A | 4/1971 | Fehr et al. |
| 4,053,671 A | 10/1977 | Carlisle |
| 4,069,727 A | 1/1978 | Sparks et al. |

(Continued)

FOREIGN PATENT DOCUMENTS

DE 197 25 949 12/1998

(Continued)

*Primary Examiner* — Rena L Dye
*Assistant Examiner* — Michele Jacobson
(74) *Attorney, Agent, or Firm* — Burr & Brown

(57) ABSTRACT

An end face of an intermediate layer of a multilayer structure is stably covered by surface resin layers at a time of cutting the multilayer structure. A cutting method of the multilayer structure includes the steps of: compressing and deforming the multilayer structure, while extending respective layers of the multilayer structure to provide a thin thickness portion, so that an upper layer bites into a lower layer by pushing a push cutter, by a predetermined amount, into the multilayer structure supported by a cutter receiving portion, in a fused state of at least one of the resin layers forming the multilayer structure; and push-cutting the compressed thin thickness portion S till the push cutter abuts against the cutter receiving portion so as to converge an intermediate layer and surface resin layers of the multilayer structure to the abutting portion A of the push cutter and the cutter receiving portion.

7 Claims, 6 Drawing Sheets

| U.S. PATENT DOCUMENTS | | | | FOREIGN PATENT DOCUMENTS | | |
|---|---|---|---|---|---|---|
| 4,648,931 A | 3/1987 | Johnston | EP | 0 546 392 A1 | 6/1993 |
| 4,708,760 A | 11/1987 | Mark et al. | JP | 62-170324 A1 | 7/1987 |
| 5,110,399 A | 5/1992 | Yoshida et al. | JP | 03-161300 A1 | 7/1991 |
| 5,293,795 A | 3/1994 | Osawa et al. | JP | 04-360794 A1 | 12/1992 |
| 5,318,420 A | 6/1994 | Blaimschein | JP | 05-050499 A1 | 3/1993 |
| 5,667,864 A | 9/1997 | Landoll | JP | 07-227259 A1 | 8/1995 |
| 5,714,033 A | 2/1998 | Hayashi et al. | JP | 08-112880 A1 | 5/1996 |
| 5,766,400 A | 6/1998 | Gallagher, Jr. | JP | 10-015879 A1 | 1/1998 |
| 6,036,811 A | 3/2000 | McGraw | JP | 63-150200 A1 | 6/1998 |
| 6,066,226 A | 5/2000 | Nagata et al. | JP | 11-048385 A1 | 2/1999 |
| 6,367,361 B1 | 4/2002 | Christensen et al. | JP | 2001-328099 A1 | 11/2001 |
| 2001/0024324 A1 | 9/2001 | Janovec | | | |

(A)

(B)

(C)

(D)

(A)

(B)

(C)

(A)

(B)

(C)

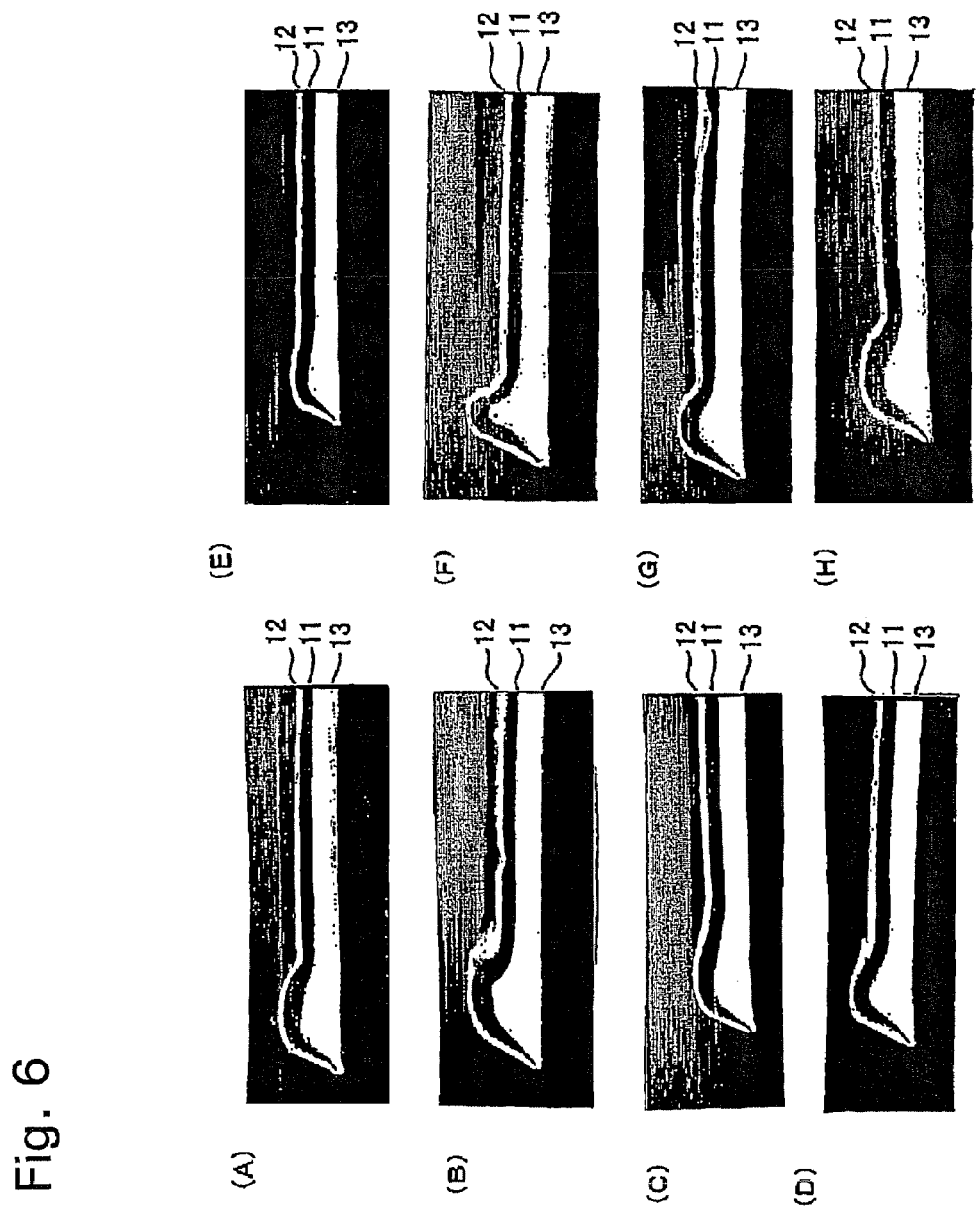

METHOD OF CUTTING MULTILAYER BODY, METHOD OF FORMING MULTILAYER CONTAINER, AND MULTILAYER FORMED PRODUCT

CROSS REFERENCE TO RELATED APPLICATION

This application is a division of U.S. application Ser. No. 10/522,392 filed Oct. 31, 2005, which was the National Stage of International Application No. PCT/JP2003/009487 filed Jul. 25, 2003, the entirety of which is incorporated herein by reference.

FIELD OF THE INVENTION

The present invention relates to a cutting method of a multilayer (or multi-layered) structure in which a cut face of an intermediate resin layer is covered with a surface resin layer simultaneously at a time of being cutting and also relates to cut product of a multilayer (or multi-layered) structure.

BACKGROUND OF THE INVENTION

A multilayer (or multi-layered) container molded by being punched out from a multilayer structure has a bad outer appearance because an intermediate resin layer is exposed outward on a cut end face of a container. Particularly, in a case of the intermediate resin layer provided with an oxygen absorbing layer, there causes a problem of splashing of iron particles, generation of rust or like because the oxygen absorbing layer contains an iron series metal as a main component.

In order to obviate such problem, in the prior art, there provides a method of covering an end face of the intermediate resin layer such as oxygen absorbing layer by extending the surface resin layer of the multilayer structure so as to turn about on the cut face side (for example, refer to Japanese Unexamined Patent Laid-Open Publication No. HEI 7-227259, No. HEI 11-48385).

In such forming method, male and female cutters (blades) are utilized for punch-out mold, and when the multilayer structure is punched out, the surface resin layer is pulled by hooking the surface resin layer to a blade edge portion to thereby cover the cut end face of the intermediate resin layer.

However, in the prior art method mentioned above, the intermediate resin layer is cut by shearing operation of the male and female cutters, there was a fear that the covering amount may largely vary in accordance with an engaging gap between the blade edge portions of the male and female cutters, and accordingly, in order to eliminate such fear, it is required for a mold to have a high precision.

Furthermore, even in a presence of proper gap, it is extremely difficult to maintain the covering amount because of environmental changes such as ambient temperature, abrasion of the mold in time elapsing, and the like, thus providing a problem that stable quality of products is not expected.

In addition, in the prior art method, the punch-out mold is heated to a temperature approximately to a Vicat softening point of the surface resin layer, which requires a temperature control.

Furthermore, since the multilayer structure is punched out by the shearing operation, burr is formed to the lower end portion of the cut end face, and it is necessary to remove such burr. In a case of large burr, there is a possibility that a portion of the intermediate resin layer exposes outside the covering area of the end face.

Still furthermore, the covering portion of the end face with the surface resin layer extends in the shearing direction of the cut end face as the sheared face, which provides an adverse adhesion to the cut end face. In addition, since the cut end face is cut through the shearing operation, the front end of the end face covering portion is likely hooked and then easily peeled.

SUMMARY OF THE INVENTION

The present invention was conceived to solve the problems mentioned above and an object of the present invention is to provide a cutting method of a multilayer structure capable of stably covering an intermediate layer at a time of cutting the multilayer structure, a molding method of a multilayer container and a multilayer product.

In order to achieve the above object, the present invention provides a method of cutting a multilayer structure composed of a plurality of resin layers so as to provide a predetermined shape, comprising the steps of: compressing and deforming a multilayer structure, while extending respective layers of the multilayer structure to provide a thin thickness portion, so that an upper layer bites into a lower layer by pushing a push cutter, by a predetermined amount, into the multilayer structure supported by a cutter receiving portion, in a fused state of at least one of the resin layers forming the multilayer structure; and push-cutting the compressed thin thickness portion till the push cutter abuts against the cutter receiving portion so as to converge an intermediate layer and surface resin layers of the multilayer structure to the abutting portion of the push cutter and the cutter receiving portion.

According to the present invention, the intermediate layer can be prevented from exposing to the end face of the multilayer structure only by the push-cutting of the push cutter.

Furthermore, since there can be provided a structure in which the multilayer structure is only push-cut by the push cutter, it is not necessary to use an expensive punching die through a shearing working using male and female cutters as in the prior art.

In addition, since there can be provided a structure of only push-cutting the multilayer structure by the push cutter, any burr is not formed to a lower end portion of the cut face as in the shearing working, thus eliminating a burr removing working.

By performing a final push-cutting of the compressed thin thickness portion after the cooling and hardening of the resin material constituting the multilayer structure below a melting point thereof, the cutting can be performed with high precision.

The final push-cutting may be performed in the fused state of the multilayer structure. The multilayer structure can be rapidly cut.

The final push-cutting of the compressed thin thickness portion may be performed in the fused state of the resin material constituting the multilayer structure.

The push cutter may have a normal temperature. Since only the cutting portion thereof partially contacts, the fused state of the resin layer can be maintained, the resin layer can be extending enough and the cut end face can be stably covered by the surface resin layers.

It is desirable that the push-cutter is a belt-shaped cutter having an endless structure in which both ends thereof are connected together.

One belt-shaped cutter can be utilized for containers having various shapes, and hence, an equipment or like can be simplified and the cost reduction can be achieved.

Furthermore, it is desirable that the push cutter has an angled edge shape having at least one side surface inclined.

According to this structure, the surface resin layer can be close contacted to the inclined surface to thereby make smooth the end face.

The multilayer structure may have a sheet shape or have a shape of a cup or tray. In addition, it may have a pouch shape. A cup or tray having no portion of the intermediate layer exposed outward can be provided by forming a multilayer container such as cup or tray by the cutting method of the present invention.

The intermediate layer may include at least a gas shut-off layer, at least an oxygen absorbing layer including an iron series deoxidizing agent, or two-layer structure composed of the oxygen absorbing layer and the gas shut-off layer. According to such structure, in a case where gas shut-off performance is required, gas leakage from the end face can be prevented.

In the case of the intermediate layer including the gas shut-off layer shutting off the gas such as oxygen, leakage of chemical component from the gas shut-off layer can be prevented. In the case of the intermediate layer including the oxygen absorbing layer containing an iron series deoxidizing agent, leakage of the deoxidizing agent and generation of rust can be prevented. Moreover, in the case of two-layer structure of the intermediate layer including the oxygen absorbing layer and gas shut-off layer, two layers can be both covered.

Furthermore, the method of forming a multilayer container of the present invention is a method in which a container body is formed by means of molding from a multilayer structure including a plurality of laminated resin layers at least one of which is in a fused state, and simultaneously, a peripheral edge portion of the container body of the multilayer structure is cut with a predetermined width so as to form a flange portion, wherein the cutting of the peripheral edge portion of the container body of the multilayer structure comprises the steps of: compressing and deforming a multilayer structure, while extending respective layers of the multilayer structure to provide a thin thickness portion, so that an upper layer bites into a lower layer by pushing a push cutter, by a predetermined amount, into the multilayer structure supported by a cutter receiving portion, in a fused state of at least one of the resin layers forming the multilayer structure; and push-cutting the compressed thin thickness portion till the push cutter abuts against the cutter receiving portion so as to converge an intermediate layer and surface resin layers of the multilayer structure to the abutting portion of the push cutter and the cutter receiving portion.

Since the flange portion is cut by pushing the push-cutter into the multilayer structure having at least one fused layer, the flange portion can be cut at the same time of forming the container body.

It is desirable that a pair of mold halves clamping the multilayer structure are disposed, a push cutter is provided for one of the mold halves and a cutter receiving portion is provided for another one of the mold halves. According to this structure, the push-cutting is performed in correlation to the opening/closing of the mold, thus eliminating forming steps.

The final push-cutting of the flange portion may be performed after the formation of the container body and the cooling and hardening of the resin before opening the mold. In this manner, the size of the flange portion can be cut with high precision.

The final push-cutting of the flange portion may be performed in the fused state of the multilayer structure. In this manner, the push cutting can be done with one cutting step.

The intermediate layer may include at least a gas shut-off layer, at least an oxygen absorbing layer including an iron series deoxidizing agent, or two-layer structure composed of the oxygen absorbing layer and the gas shut-off layer.

The multilayer product of the present invention is a product formed by push-cutting a multilayer structure composed of a plurality of laminated resin layers between a cutter receiving portion and a push cutter so as to provide a predetermined shape, wherein a push-cut point between the push cutter and the cutter receiving portion is positioned on a side surface of the multilayer structure opposite to the push cutter, and an intermediate layer and surface resin layers are converged to the push-cut point. Thus, the product has no portion of the intermediate layer exposed outward and a stably covered structure can be provided at the end face thereof.

Furthermore, according to the structure in which the respective layers constituting the multilayer structure are parallel to each other and converged at end portions towards the push-cut point, and a portion continuing from the parallel portion to the converged portion is creased as a protruded portion on the push cutter side, the surface resin layer is pushed against the side surface of the push-cutter, so that the end face shape of the product can be made stable.

The multilayer structure is a cup or tray, or in form of pouch. Thus, a cup, tray of pouch having no portion of the intermediate layer exposed outward can be provided.

Furthermore, the intermediate layer may include at least a gas shut-off layer, at least an oxygen absorbing layer including an iron series deoxidizing agent, or two-layer structure composed of an oxygen absorbing layer and a gas shut-off layer.

BRIEF DESCRIPTION OF THE DRAWINGS

FIGS. 6(A) to (H) are views showing examples of a photograph of a section of a flange portion molded by the forming method of the multilayer container of the present invention.

DETAILED DESCRIPTION OF THE INVENTION

Figure 1:
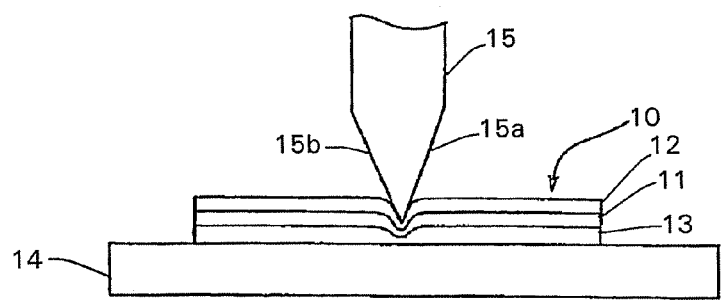
FIGS. 1(A) to (D) are views schematically showing a cutting method of a multilayer structure according to the present invention.
Figure 1:
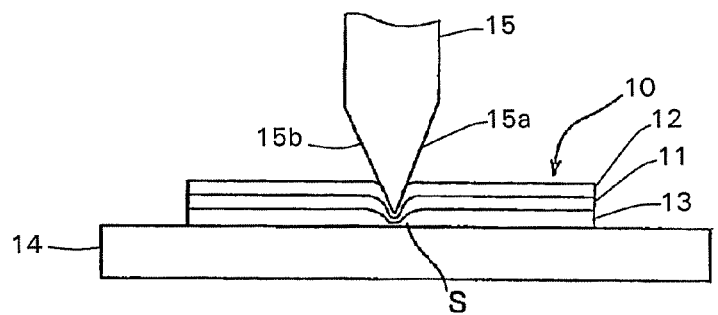
Figure 1:
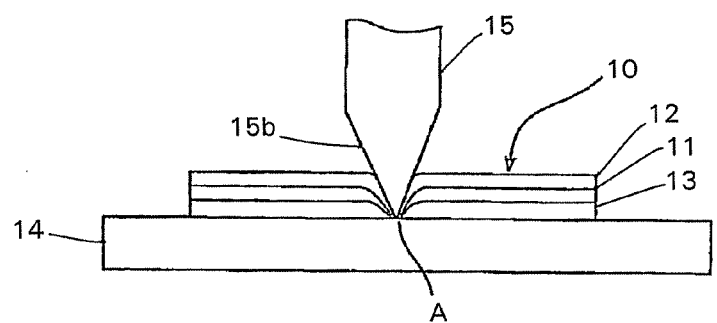
Figure 1:
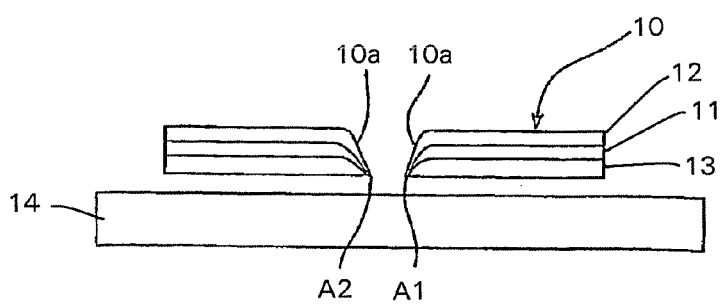

Hereunder, the present invention will be described with reference to embodiments shown in the drawings.

FIG. 1 is a schematic view explaining the cutting method of the multilayer (or multi-layered) structure according to the present invention.

A multilayer structure 10 to be cut is composed of a sheet of three-layered structure including an intermediate resin layer 11 as an intermediate layer and a pair of surface resin layers 12 and 13 disposed so as to sandwich the intermediate resin layer 11 therebetween. Bonding agent layers, not shown, may be formed between the adjacent layers 11, 12 and 13 so as to tightly bond them together.

In such multilayer structure 10, at least one layer is in a fused state, and by pushing a push cutter 15 by a predetermined amount into the multilayer structure 10, which is supported at one side thereof by a cutter receiving (bearing) portion 14, from the other side thereof, the respective layers 11, 12 and 13 are extended so as to be deformed thinner under compression while an upper layer is pushed into a lower layer (see FIGS. 1(A) and (B)). Further, though not shown herein, the resin layer as the lower layer is bilaterally pushed by side surfaces 15a, 15b of the push cutter 15 so as to be slightly creased as protruded portion expanding outward on both side portions of the push cutter 15. The shape or size of the creased protruded portion 121a will change in accordance with the molding conditions, the thickness of the resin layer and the angle of the hand push cutter.

In the next step, a portion S compressed so as to provide the thin thickness portion is cut by pushing down the push cutter 15 till the blade front edge thereof abuts against of the cutter receiving portion 14, and the respective layers of the intermediate resin layer 11 and the surface resin layers 12 and 13 are pushed in a converged fashion to an abutting portion A between the push cutter 15 and the cutter receiving portion 14 (see FIG. 1(C)).

Since the push cutter 15 bites deeply at least one of the layers in the fused state, the fused layer is not cut off and deformed so as to provide inclined surfaces following the shapes of the side surfaces of the push cutter 15, and the end face 10a of the cut multilayer structure 10 is maintained in a state covered with one of the surface resin layer 12 without the intermediate resin layer 11 being exposed outside.

Furthermore, since the thin thickness portion S of the entire layer structure is finally cut off, the respective layers are pressed till the respective layers have crushed so as to provide very thin thickness portions and then cut, so that the cutting points A1 and A2 are converged substantially to one point. Especially, as to the intermediate resin layer 11, the cut portion thereof has a very thin thickness and is substantially covered by the paired surface resin layers 12 and 13 sandwiching the intermediate resin layer 11 therebetween.

The biting depth (dimension) of the push cutter 15 in the fused state of the layer will be suitably selected in consideration of the thickness of the multilayer structure 10, the structure of the layers, the kinds of the resin materials and so on.

The push cutting of the thin thickness portion S may be done after cooled and hardened below a melting point of temperature of the resin constituting each layer of the multilayer structure 10, or may be done in the fused state of the resin.

It is desirable that the push cutter 15 has a normal temperature, and it is also desirable for the cutter receiving portion 14 to have a normal temperature.

The push cutter 15 is composed of a flexible belt-shaped cutter blade. The belt-shaped cutter can cut the structure in linear form, curved form or endless circular form.

The push cutter 15 has both inclined side surfaces 15a and 15b providing double edge shape. In a structure that both side surfaces form a small angle, the surface resin layer 12 will be cut, and therefore, it will be desired for such angle to be more than 30 degrees.

The push cutter 15 may have asymmetric double edge shape of the side surfaces 15a and 15b in its angle or have a single edge shape having only one inclined side surface.

That is, as shown in FIG. 5(E), the push cutter 15 has one side surface 15a, which is formed into flat shape, abutting against the end edge face 121 of the flange portion 20 of the container 100, and on the other hand, the other side surface 15b is formed as inclined surface. In such structure, the protruding amount of the protruded portion 121a will be suppressed minimally, thus being desirable.

Figure 2:
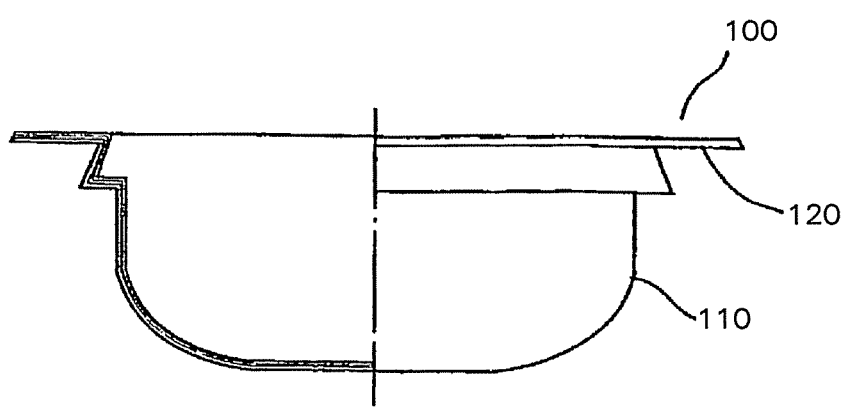
FIGS. 2(A) to (C) are views schematically showing a multilayer container produced in accordance with a molding method of a multilayer container according to the present invention, in which (A) is a front view half in section, (B) is an enlarged sectional view of a flange end portion, (C) is an enlarged flange end portion having a clamp flaw.
Figure 2:
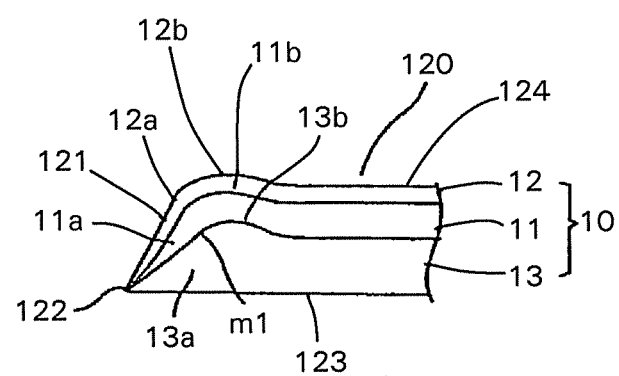
Figure 2:
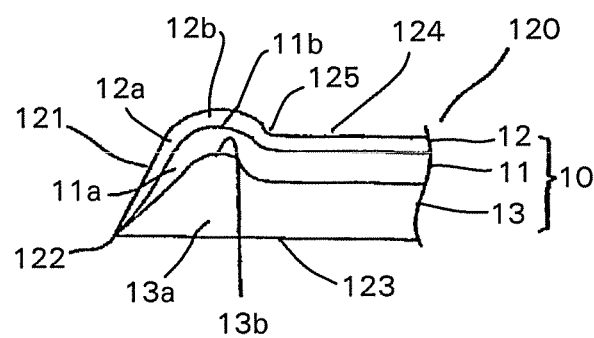

FIG. 2 represents a multilayer (multi-layered) container 10 formed from the multilayer structure in form of sheet.

The multilayer container 100 comprises a cup-shaped container body 110 which is drawn from the sheet-shaped multilayer structure 10 mentioned above and a flange or flanged portion 120 extending outward from a peripheral edge portion of an opening of the cup-shaped container body 110, and the container 100 is formed, using the multilayer structure cutting method mentioned above, by push-cutting a portion corresponding to the outer end of the flange portion 120 of the multilayer structure 10 between the push cutter 15 and the cutter receiving portion 14 so as to provide a predetermined shape.

The thicknesses of the respective resin layers of the multilayer structure 10, in this embodiment, will be as follows: the surface resin layer 13 as lowermost layer (constituting an outer layer of the container wall) has a largest thickness corresponding to substantially half thickness of the container wall, the surface resin layer 12 as uppermost layer (constituting an inner layer of the container wall) has a smallest thickness, and the intermediate resin layer 11 has a middle thickness therebetween.

The flange portion 120 has, as shown in FIG. 2(B), a lower surface portion 123 and an upper surface portion 124 both being in parallel to each other, the former having a diameter larger than the latter, and the flange end face 121 is formed as an inclining surface portion widened downward from the outer diameter end portion of the flange upper surface portion 124 towards the outer diameter end portion of the flange lower surface portion 123.

The flange end face 121 has a sharp-angled lower edge portion as a cutting (or cut) point 122 of the push cutter 15, and the respective layers forming the flange portion 120 are converged, at their end portions, to this cutting point 122.

The respective resin layers 11, 12 and 13 constituting the flange portion 120 are parallel to the flange lower surface 123 and the flange upper surface 124 and have a structure converged to the cut point 122 at the ends of the flange portion 12. Further, portions between these parallel portions and converged portions are creased as protruded portion, on the upper surface 124 side by laterally pressed by the side surfaces of the push cutter 15.

That is, the sectional converged shape of the end portion 13a of the surface resin layer 13 as the lowermost layer has a triangle shape having the cutting point 122 being the apex point, and an angle constituted by a boundary surface m1 between the intermediate resin layer 11 and the flange lower surface 123 with respect thereto is smaller than the angle constituted by the flange end face 121 with respect to the lower surface portion 123.

The end portion 11a of the intermediate resin layer 11 has a rostral shape in section with the cutting point 122 being the apex point, which is overlapped with the end portion 13a of the lower surface resin layer 13 in shape of triangle.

The end portion 12a of the upper surface resin layer 12 has a thin thickness, extends to the cutting point 122 and is overlapped with the lower rostral-shaped end portion 11a of the intermediate resin layer 11.

The lower surface resin layer 13 has a creased (protruded) portion 13b which is protruded towards the intermediate resin layer 11 side at the boundary surface m1 between the intermediate resin layer 11 and the surface resin layer 13, and the creased (protruded) portion 11b of the intermediate resin layer 11 and the creased portion 12b of the upper surface resin layer 12 are overlapped, in location, with the creased portion 13b of the lower surface resin layer 13.

The end portion 12a of the upper surface resin layer 12 has a thin thickness and is totally expanded, so that the end portion 12a has less change in thickness compared with the lower resin layer, at which the end portion thereof extends finely towards the front end thereof. On the other hand, the end portion 13a of the lowermost surface resin layer 13 does not extend downward and is deformed laterally under compression by the pushing force of the push cutter 15 to thereby make large the creased portion 13b. The deformation of the intermediate resin layer 11 is middle. Thus, the deformed conditions of the respective layers change depending on the thicknesses of the respective resin layers, the positional relationship therebetween and the like.

FIG. 2(C) shows an example having a clamp mark 125 at a time when the flange portion 120 is pressed by the mold at the molding process. Since the flange portion 120 is compressed by the clamping pressure, the creased portions 13b, 11b and 12b between the clamped portions and the converged structures of the flange end portions are further get magnified.

The surface resin layers 12 and 13 of the multilayer structure 10 forming the multilayer container 100 is formed of a thermoplastic resin such as polypropylene group resin, and the intermediate resin layer 11 is formed from a single layer structure of the oxygen absorbing layer or gas shut-off layer or double layer structure of these layers.

As the oxygen absorbing layer, a thermoplastic resin mixed with an iron series deoxidizing agent or other oxygen absorbing polymers (olefin type, polyester type, urethane type or like).

The oxygen absorbing polymers include, for example, ethylene-vinyl acetate copolymer saponification compound and others which are prepared by blending polyamide group gas-barrier resins such as nylon 6, nylon 6•6, nylon 6/6•6 copolymer, metaxylylene adipamide with oxidizing resins or transition metal group catalyst.

The oxidizing resins may include: ① a resin including carbon side chain and at least one functional group, as main chain or side chain, selected from the groups of carboxylic acid group, carboxylic acid anhydride group, carboxylic acid ester group, carboxylic amide group, and carbonyl group, ② a polyamide resin such as metaxylylene adipamide, ③ a ethylene group unsaturated group contained copolymer.

The transition metal group catalyst is a catalyst for an oxidizing reaction of the oxidizing resin and is formed of organic acid salt or organic complex salt of the transition metal. The transition metal group catalysts include, for example, iron, cobalt, nickel, copper, silver, tin, titanium, zirconium, vanadium, chromium, manganese and so on.

The gas shut-off layer is formed, for example, of ethylene-vinyl acetate copolymer saponification compound and others including blending polyamide group such as nylon 6, nylon 6•6, nylon 6/6•6 copolymer, metaxylylene adipamide, resin coating agent, inorganic evaporation layer and so on.

The surface resin layers 12 and 13 are formed of thermoplastic resins including polypropylene group resin, polystyrene group resin, polyethylene terephthalate group resin or like. These paired surface resin layers 12 and 13 may be formed of resin materials different from each other.

The intermediate resin layer 11 may be formed from the single layer of oxygen absorbing layer, the single gas shut-off layer or other resin layer. The intermediate layer 11 is not limited to the resin layer and may be formed of a metal layer such as aluminium foil layer. In the case of the multilayer structure including the intermediate layer composed of the metal layer such as aluminium foil layer, it will be preferably utilized for a film of a pouch.

Figure 3:
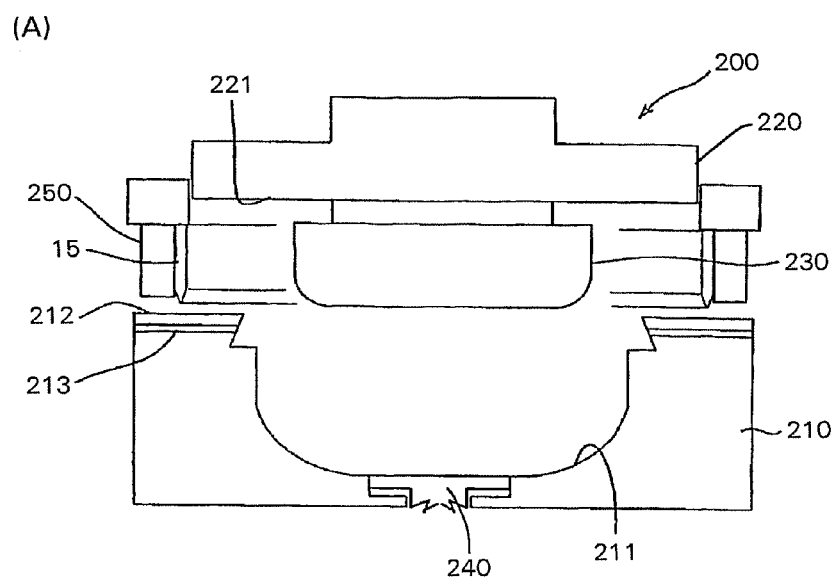
FIG. 3(A) is a sectional view showing a mold of the multilayer container of FIG. 2.
FIG. 3(B) is a perspective view of a push cutter of the mold of 3(A)
FIG. 3(C) is a perspective view showing the push cut in form of ring.
Figure 3:
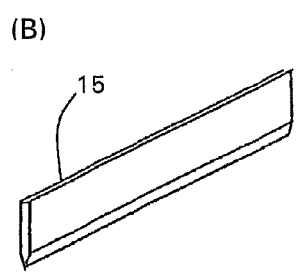
Figure 3:
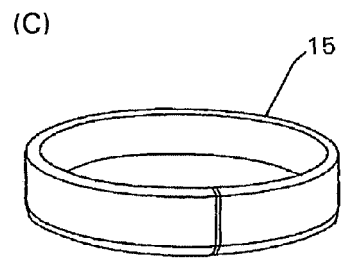
Figure 4:
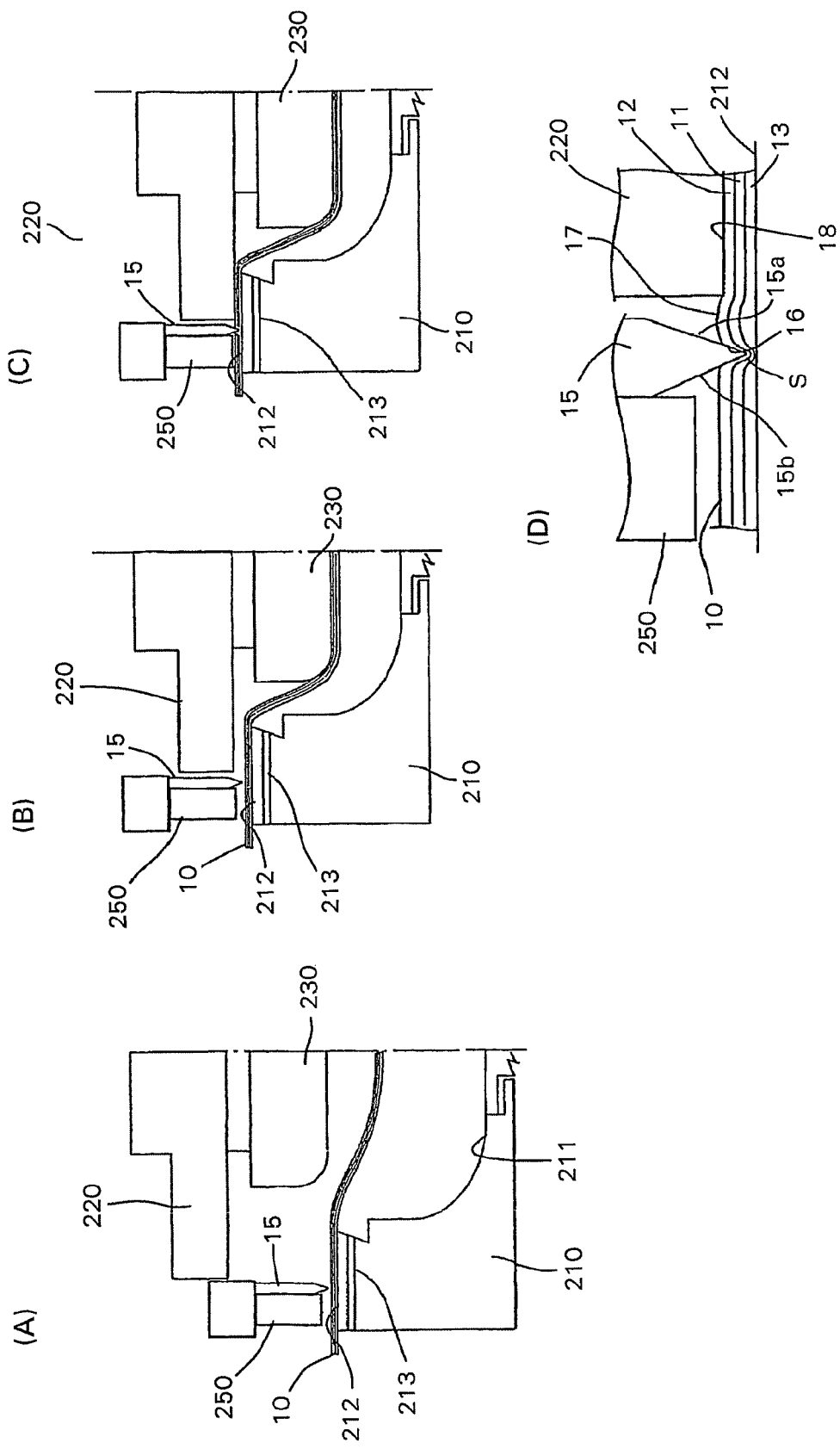
FIGS. 4(A) to (D) are views showing molding steps of the multilayer container.
Figure 5:
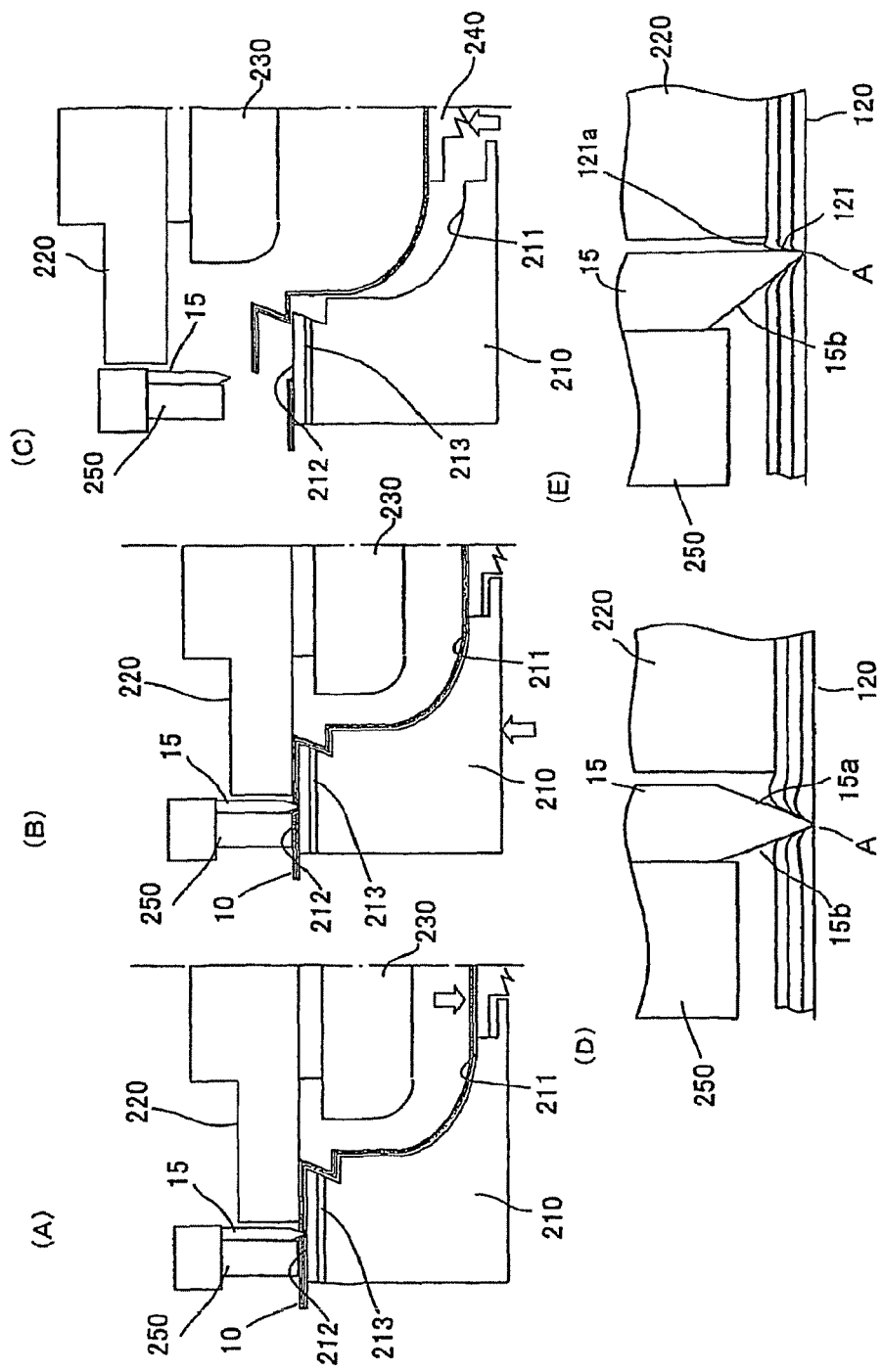
FIGS. 5(A) to (D) are views showing molding steps of the multilayer container.

Hereunder, with reference to FIGS. 3 to 5, the method of forming the multilayer container of the structure mentioned above will be described.

The multilayer container 100 is formed from the sheet-shaped multi layer structure 10 into the container body 110 having cubic structure by pneumatic forming (molding), vacuum forming (molding) or vacuum-pneumatic forming (molding), and at the same time of this container body forming, the flange portion 120 is punched out in the round form and cut off.

First, with reference to FIGS. 3(A)-(C), the mold or molding die 200 will be described.

The mold or molding die 200 includes a pair of first and second mold halves 210 and 220 which clamps the multilayer structure 10. The push cutter 15 is provided for the second mold half 220 and, on the other hand, a support pedestal 212 constituting the cutter receiving portion is provided for the first mold half 210.

The first mold half 210 has a cavity 211 forming the container body 110 and a flat annular support pedestal 212 provided for the peripheral edge portion of the opening of the cavity 211. The second mold half 220 is provided with a clamp 221 engageable with an area of the upper surface of the support pedestal 212 of the first mold half 210 on the inner diameter side thereof.

A plug 230 for pushing the multilayer structure 10 having at least one fused layer into the cavity 211 is provided on the side the second mold half 220. In the illustrated example, although the plug 230 is described to be movable with the second mold half 220, it may be disposed independently from the second mold half 220 so as to be movable separately.

Furthermore, an ejector mold 240 for releasing the multilayer container 100 molded in the cavity 211 so as to be creased and protruded therein after the molding is provided for the bottom portion of the cavity 211 of the first mold half 210.

In addition, the push cutter 15 for cutting under pressure the flange portion 120 is provided on the side of the second mold half 220. This push cutter 15 is arranged at a position opposing to the upper surface of the support pedestal 212 of the first mold half 210 on the outside of the outer end portion of the clamp portion 221 of the second mold half 220. The estimated cutting position by the front end portion of the push cutter 15 is a position apart outside, by a predetermined distance, from the outer end of the clamp area of the clamp portion 221.

It is desirable to form the surface layer of the support pedestal 212 with a hard material having heat insulation property, and a soft material 213 such as bronze is embedded, as a lower layer, below this hard surface layer so as to be capable of absorbing a shock at the abutment of the push cutter 15.

The push cutter 15 is formed from a flexible band-shaped cutter blade and used by connecting both ends thereof to be endlessly (see FIGS. 3(B) and (C)), and the push cutter 15 is fitted to the inner periphery of a holder 250 and held thereby along the inner periphery thereof. Further, although, in the illustrated example, the push cutter 15, i.e., the holder 250 has a circular shape, it may have a rectangular shape, elliptical shape or other shape in accordance with the shape of the container 100.

Hereunder, the multilayer container forming (molding) method will be explained with reference to FIGS. 4 and 5.

The molding process includes a sheet feed step, preceding plug insertion step, a mold closing step, an pressure molding step, a flange portion cutting step and a knock out step.

In the sheet feed step, as shown in FIG. 4(A), the multilayer structure 10 which has at least one of the layers in the fused state is fed to the upper surface of the first mold half 210 of the mold. The multilayer structure 10 is weighed down by its self-weight into the cavity 211 of the first mold half 210.

In the preceding plug insertion step, as shown in FIG. 4(B), the plug 230 is pushed downward beforehand the molding of the container body 110 so as to push the multilayer structure 10 into the cavity 211 of the first mold half 210 by a predetermined amount.

In the mold closing step, as shown in FIG. 4(C), the push cutter 15 is pushed into the multilayer structure 10 by a predetermined depth during at least one layer of the multilayer structure 10 being maintained in the fused state beforehand the molding of the container body 110. When the second mold half 220 contacts the multilayer structure 220, the temperature of the multilayer structure 10 is rapidly lowered and then hardened, so that, in the state of the second mold half 220 not contacting the multilayer structure 10, that is, in the state that the temperature of the multilayer structure 10 is kept to be more than its melting point, the push cutter 15 is pushed into the multilayer structure 10 from its other side surface and the multilayer structure 10 is compressed into thin shape while deforming the respective layers so that the portions to be cut by the push cutter 15 follow the sectional shape thereof. At this moment, the multilayer structure is not cut off and the front end of the push cutter 15 and the upper surface of the support pedestal 212 are separated from each other by a distance corresponding to the thin thickness portion S.

Since at least one of the layers of the multilayer structure 10 is in the fused state, the intermediate resin layer 11 and the paired surface resin layers 12 and 13 are not cut off and the respective layers are extended with thin thickness while maintaining the three-layer structure.

Further, since the above-mentioned preceding plug insertion step and the mold closing step shown in FIG. 4(A) to (C) progress extremely rapidly in a short time, the fused state of at least one layer of the multilayer structure can be maintained.

Immediately after the biting of the push cutter 15 into the multilayer structure 10 by the predetermined amount, the lower surface of the second mold half 220 contacts the upper surface of the multilayer structure 10 and the portion thereof inside the biting portion of the push cutter 15 is clamped.

As shown in FIG. 4(D), the multilayer structure 10 is compressed by the clamping force through the lower surface of the second mold half 220, and an annular non-compressed area 17 exists between the lower surface of the second mold half 220 and the biting portion 16 of the push cutter 15. Accordingly, the fluidized resin material is moved to the non-compressed side 17 from the compressed portion 18 compressed by the second mold half 220 and the biting portion 16 of the push cutter 15, and then, the respective layers of the multilayer structure 10 are curved so as to be protruded entirely at the non-compressed portion 17.

It is desired for the push cutter 15 to have the normal temperature.

In the pneumatic molding step, as shown in FIG. 5(A), the pressurized air is blown into a space between the second mold half 220 and the multilayer structure 10 at an instant of the completion of the clamping, and the multilayer structure 10 is closely contacted to the inner periphery of the cavity 211 of the first mold half 210 so as to cool and harden the multilayer structure. The container body 110 may be formed by vacuuming the space between the first mold half 210 and the multilayer structure 10 in place of blowing the pressurized air. Further, the container body 110 may be formed by both the pneumatic forming and vacuum forming.

In the flange portion push-cutting step, as shown in FIG. 5(B), after the formation of the container body 110, the first mold half 210 is raised upward with the push cutter 15 being stopped, and finally, the front end of the push cutter 15 abuts against the support pedestal 212 to thereby push-cut the thin thickness portion S and form the flange portion 120. The cutting may be done by pushing down the push cutter 15 with the first mold half 210 being fixed.

As this result, as shown in FIG. 5(D), the intermediate resin layer 11 and the surface resin layers 12, 13 are converged to the abutting portion A of the push cutter 15 and the support pedestal 212.

Further, this push-cutting of the flange portion 120 from the multilayer structure 10 may be performed in the fused state before the forming of the container body 110 (i.e., mold closing time).

After the push-cutting step, the product is knocked out.

In this knock-out step, as shown in FIG. 5(C), with the first mold half 210 being fixed, the second mold half 220 and the push cutter 15 are raised upward, and at the same time, the knock-out mold 240, arranged at the bottom portion, is pushed upward. Thus, the bottom portion of the container body 110 is pushed upward, so that the container body 110 is released from the cavity 211 of the first mold half 210.

Further, in the embodiment described above, although the push cutter 15 is provided in adjacent to the second mold half 220 and the support pedestal 212 of the first mold half 210 is formed as the cutter receiving portion, the cutter receiving portion may be provided on the side of the second mold half 220 and the push cutter 15 may be disposed in adjacent to the first mold half 210 having the cavity 211.

In addition, in the above-mentioned embodiment, although the multilayer container formed, as a multilayer product, by cutting the periphery of a container such as cubic cup or tray, for example, the multilayer product may be a pouch constituting a bag formed of such multilayer structure.

FIGS. 6(A) to (H) show photographs, in section, of the flange portions of the actually manufactured multilayer containers.

In any case of the photograph, the flange end portions of the respective resin layers 11, 12 and 13 are converged to the cut-off point, and therefore, the end faces of the flange portions can be completely covered by one of the resin layers without the intermediate resin layer being exposed to the flange end faces.

Furthermore, as to the clamp flaw, as shown in FIGS. 6(C) and (E), it does not appear in accordance with the forming conditions. Further, any creased and protruded portion is not substantially formed in the example of FIG. 6(E).

What is claimed:

1. A method of forming a multilayer container in which a container body is formed by means of molding from a multilayer structure including a plurality of laminated resin layers at least one of which is in a fused state, and cutting a predetermined width of a peripheral edge portion of the container body of the multilayer structure so as to form a flange portion, wherein the cutting of the peripheral edge portion of the container body of the multilayer structure comprises the steps of:

compressing and deforming said multilayer structure, while extending respective layers of the multilayer structure to provide a thin thickness portion, so that an upper layer bites into a lower layer by pushing a push cutter, by a predetermined amount, into the multilayer structure supported by a cutter receiving portion, while at least one of the resin layers forming the multilayer structure is in a fused state;

then cooling and hardening the at least one resin layer in the fused state in the multilayer structure below the melting point thereof;

then push-cutting the compressed thin thickness portion till the push cutter abuts against the cutter receiving portion so as to converge an intermediate layer and surface resin layers of the multilayer structure to the abutting portion of the push cutter and the cutter receiving portion.

2. The method of forming a multilayer container according to claim 1, wherein a pair of mold halves clamp the multilayer structure, and a push cutter is provided for in one of the mold halves and a cutter receiving portion is provided for another one of the mold halves.

3. The method of forming a multilayer container according to claim 1, wherein the push-cutting of the flange portion is performed after the forming of the container body.

4. The method of forming a multilayer container according to claim 1, wherein the push-cutting of the flange portion is performed in the fused state of the multilayer structure before the forming of the container body.

5. The method of forming a multilayer container according to claim 1, wherein at least one of the plurality of resin layers of the multilayer structure comprises a gas shut-off layer.

6. The method of forming a multilayer container according to claim 1, wherein at least at least one of the plurality of resin layers of the multilayer structure comprises an oxygen absorbing layer including an iron series deoxidizing agent.

7. The method of forming a multilayer container according to claim 1, wherein at least one of the plurality of resin layers of the multilayer structure comprises a two-layer structure composed of an oxygen absorbing layer and a gas shut-off layer.

* * * * *